(12) United States Patent
Sun et al.

(10) Patent No.: US 10,039,045 B2
(45) Date of Patent: *Jul. 31, 2018

(54) APPARATUS AND METHOD FOR RELAYING BY MOBILE DEVICE

(71) Applicant: HISENSE MOBILE COMMUNICATIONS TECHNOLOGY CO., LTD., Qingdao (CN)

(72) Inventors: Zizhi Sun, Qingdao (CN); Bin Zheng, Qingdao (CN); Chuanqing Yang, Qingdao (CN); Shijiao Chen, Qingdao (CN); Linhu Zhao, Qingdao (CN); Shidong Shang, Qingdao (CN); Changsheng Zhou, Qingdao (CN)

(73) Assignees: HISENSE MOBILE COMMUNICATIONS TECHNOLOGY CO., LTD., Qingdao (CN); HISENSE USA CORPORATION, Suwanee, GA (US); HISENSE INTERNATIONAL CO., LTD., Qingdao (CN)

( * ) Notice: Subject to any disclaimer, the term of this patent is extended or adjusted under 35 U.S.C. 154(b) by 125 days.

This patent is subject to a terminal disclaimer.

(21) Appl. No.: 15/055,181

(22) Filed: Feb. 26, 2016

(65) Prior Publication Data

US 2017/0094578 A1    Mar. 30, 2017

(30) Foreign Application Priority Data

Sep. 30, 2015   (CN) .......................... 2015 1 0643875

(51) Int. Cl.
*H04W 40/02*    (2009.01)
*H04L 29/12*    (2006.01)
(Continued)

(52) U.S. Cl.
CPC ........ *H04W 40/02* (2013.01); *H04B 7/15507* (2013.01); *H04L 61/2514* (2013.01);
(Continued)

(58) Field of Classification Search
CPC .. H04W 40/02; H04W 40/24; H04B 7/15507; H04L 61/1511
See application file for complete search history.

(56) References Cited

U.S. PATENT DOCUMENTS

2007/0050418 A1 * 3/2007 Lin .......................... G06F 21/79
2007/0211714 A1   9/2007 Metke et al.
(Continued)

FOREIGN PATENT DOCUMENTS

CN   102143509    8/2011
CN   201976256    9/2011
(Continued)

OTHER PUBLICATIONS

Office Action from corresponding Chinese Application No. 201510643875.8 dated Jan. 2, 2018 (7 pages).
(Continued)

*Primary Examiner* — Jamal Javaid
*Assistant Examiner* — Saad Khawar
(74) *Attorney, Agent, or Firm* — Harness, Dickey & Pierce P.L.C.

(57) ABSTRACT

An apparatus and method for relaying by a mobile device, the apparatus including: a wireless access node connecting module configured to connect to an external wireless access point through a station node of Wi-Fi, which is inbuilt in the mobile device; a relay instruction sending module configured to send a relay instruction to a Wi-Fi module inbuilt in the mobile device through a P2P node of Wi-Fi, which is inbuilt in the mobile device so that logon information of the mobile device is broadcasted, and one or more external (Continued)

electronic devices connect with the mobile device through the P2P node; a packet forward enabling module configured to enable a packet forward function; and a packet forward configuring module configured to send configuration information of packet forwarding to the Wi-Fi module so that a data packet is forwarded between the station node and the P2P node.

16 Claims, 5 Drawing Sheets

(51) Int. Cl.
    *H04B 7/155*       (2006.01)
    *H04W 40/24*      (2009.01)
    *H04W 84/12*      (2009.01)
    *H04W 88/04*      (2009.01)

(52) U.S. Cl.
    CPC ......... *H04L 61/2557* (2013.01); *H04W 40/24* (2013.01); *H04L 61/1511* (2013.01); *H04W 84/12* (2013.01); *H04W 88/04* (2013.01)

(56) References Cited

U.S. PATENT DOCUMENTS

2008/0229025 A1* 9/2008 Plamondon ......... G06F 12/0862
                                                  711/126
2010/0061268 A1* 3/2010 Nishio ................... G06F 3/122
                                                  370/254
2011/0040870 A1* 2/2011 Wynn ................ H04L 63/0428
                                                  709/224
2014/0056209 A1   2/2014 Park et al.
2014/0334335 A1* 11/2014 Barathalwar ......... H04W 48/16
                                                  370/254
2015/0244876 A1   8/2015 Jabara et al.
2016/0094662 A1* 3/2016 Kollu ................. H04L 43/0882
                                                  709/224
2016/0174140 A1* 6/2016 Wu ........................ G08C 17/02
                                                  370/329
2017/0041977 A1   2/2017 Yokoyama et al.
2017/0094578 A1   3/2017 Sun et al.

FOREIGN PATENT DOCUMENTS

| CN | 102342153 | 2/2012 |
|----|-----------|--------|
| CN | 103401790 | 11/2013 |
| CN | 103857067 | 6/2014 |
| CN | 204145497 | 2/2015 |

OTHER PUBLICATIONS

Office Action from related Chinese Application No. 201510642744.8 dated Jan. 3, 2018 (7 pages).

* cited by examiner

APPARATUS AND METHOD FOR RELAYING BY MOBILE DEVICE

CROSS-REFERENCE TO RELATED APPLICATION

This application claims the benefit and priority of Chinese Patent Application No. 201510643875.8, filed Sep. 30, 2015. The entire disclosure of the above application is incorporated herein by reference.

FIELD

The present disclosure relates to the field of mobile communications and particularly to an apparatus and method for relaying by a mobile device.

BACKGROUND

This section provides background information related to the present disclosure which is not necessarily prior art.

Wireless signals, e.g., Wireless Fidelity (Wi-Fi), have been widely applied to the various aspects of our life due to their convenience and expeditiousness.

The strength and coverage area of the wireless signals in wireless communication have been significant factors bothering users.

For example, if a router is placed in a sitting room, and a handset is placed in a bedroom, then there will be such a poor Wi-Fi signal that an access to the Internet may not be stable.

In another example, the searching handset locates a Wi-Fi signal outdoors, but the signal is so weak that an access indoors to the Internet may not be stable, and the signal can enable the access to the Internet only in a balcony or out of a window.

In a further example, the area of the a room is larger than the coverage area of the signal, so if the user holding his or her handset is walking in the larger room, then a blind spot of the signal may frequently occur in the room, thus interrupting the access to the Internet, etc.

SUMMARY

This section provides a general summary of the disclosure, and is not a comprehensive disclosure of its full scope or all of its features.

An embodiment of the present application discloses a method for relaying by a mobile device, the method including:
  accessing, by the mobile device, to an external wireless access point through a station node of Wi-Fi inbuilt in the mobile device;
  sending, by a P2P, Peer-to-Peer, node of Wi-Fi inbuilt in the mobile device, a relay instruction to a Wi-Fi module inbuilt in the mobile device, so that logon information of the mobile device is broadcasted, and one or more external electronic devices access to the mobile device through the P2P node;
  enabling, by the mobile device, a packet forward function so that a data packet is forwarded between the different nodes of Wi-Fi inbuilt in the mobile device; and
  sending, by the mobile device, configuration information of packet forwarding to the Wi-Fi module so that a data packet is forwarded between the station node and the P2P node.

An embodiment of the present application further discloses an apparatus for relaying by a mobile device, the apparatus including:
  a wireless access node connecting module configured to access to an external wireless access point through a station node of Wi-Fi inbuilt in the mobile device;
  a relay instruction sending module configured to send a relay instruction to a Wi-Fi module inbuilt in the mobile device through a P2P node of Wi-Fi inbuilt in the mobile device so that logon information of the mobile device is broadcasted, and one or more external electronic devices access to the mobile device through the P2P node;
  a packet forward enabling module configured to enable a packet forward function so that a data packet is forwarded between the different nodes of WiFi inbuilt in the mobile device; and
  a packet forward configuring module configured to send configuration information of packet forwarding to the Wi-Fi module so that a data packet is forwarded between the station node and the P2P node.

An embodiment of the present application further discloses an apparatus for relaying by a mobile device, applicable to the mobile device, the apparatus including:
  a processor; and
  a memory storing at least one instruction configured to be executed by the processor:
  to access to an external wireless access point through a station node of Wi-Fi inbuilt in the mobile device;
  to send a relay instruction to an Wi-Fi module inbuilt in the mobile device through a P2P node of Wi-Fi inbuilt in the mobile device so that logon information of the mobile device is broadcasted, and one or more external electronic devices access to the mobile device through the P2P node;
  to enable a packet forward function so that a data packet is forwarded between the different nodes of Wi-Fi inbuilt in the mobile device; and
  to send configuration information of packet forwarding to the Wi-Fi module so that a data packet is forwarded between the station node and the P2P node.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

BRIEF DESCRIPTION OF THE DRAWINGS

The drawings described herein are for illustrative purpose only of selected embodiments and not all possible implementations, and are not intended to limit the scope of the present disclosure.

DETAILED DESCRIPTION OF THE EMBODIMENTS

Example embodiments will now be described more fully with reference to the accompanying drawings.

Figure 1:
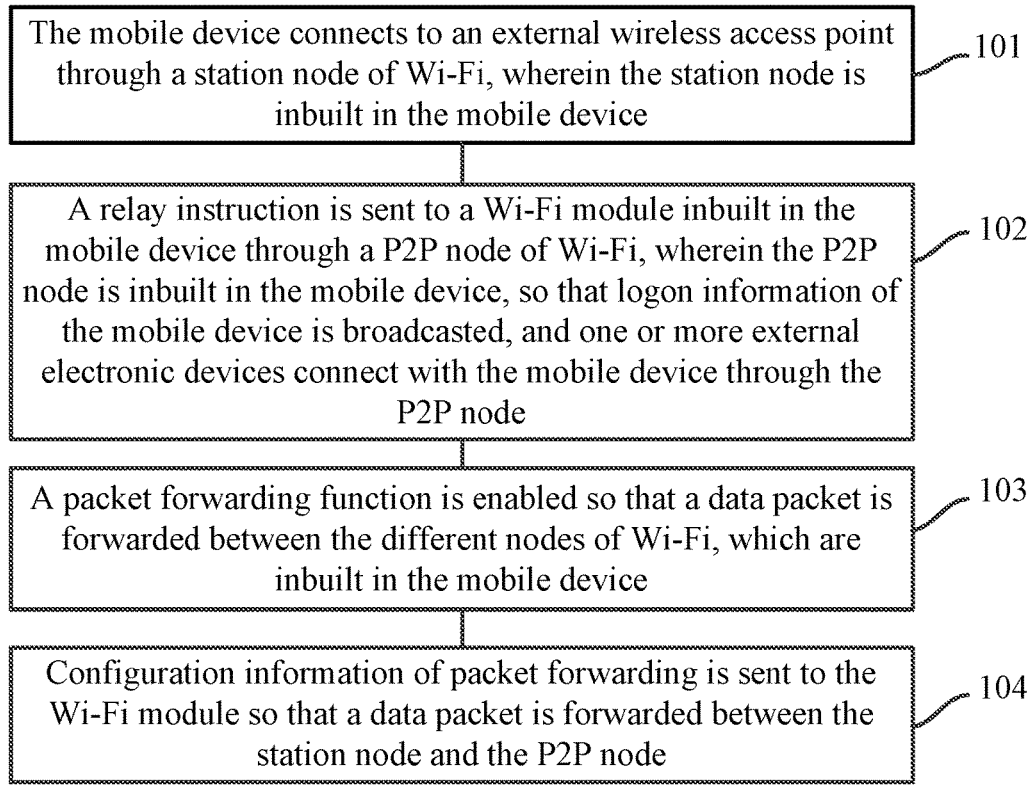
FIG. 1 is a flow chart of a process of some embodiments of a method for relaying by a mobile device according to the present application.

Referring to FIG. 1, there is illustrated a flow chart of a process of a method for relaying by a mobile device according to an embodiment of the present application, where the method can include the following steps:

In the step 101, the mobile device connects to an external wireless access point through a station node of Wi-Fi, wherein the station node is inbuilt in the mobile device;

It shall be noted that the method according to the embodiment of the present application can be applicable to an operating system of the mobile device, e.g., a handset, a tablet computer, a smart wearable device (e.g., a smart watch), etc.

These mobile devices generally support Windows Phone, Android, IOS, Windows, and other operating systems, and typically can connect to the wireless Access Point (AP), e.g., a router or an AP-enabled terminal, through Wi-Fi.

Figure 2:
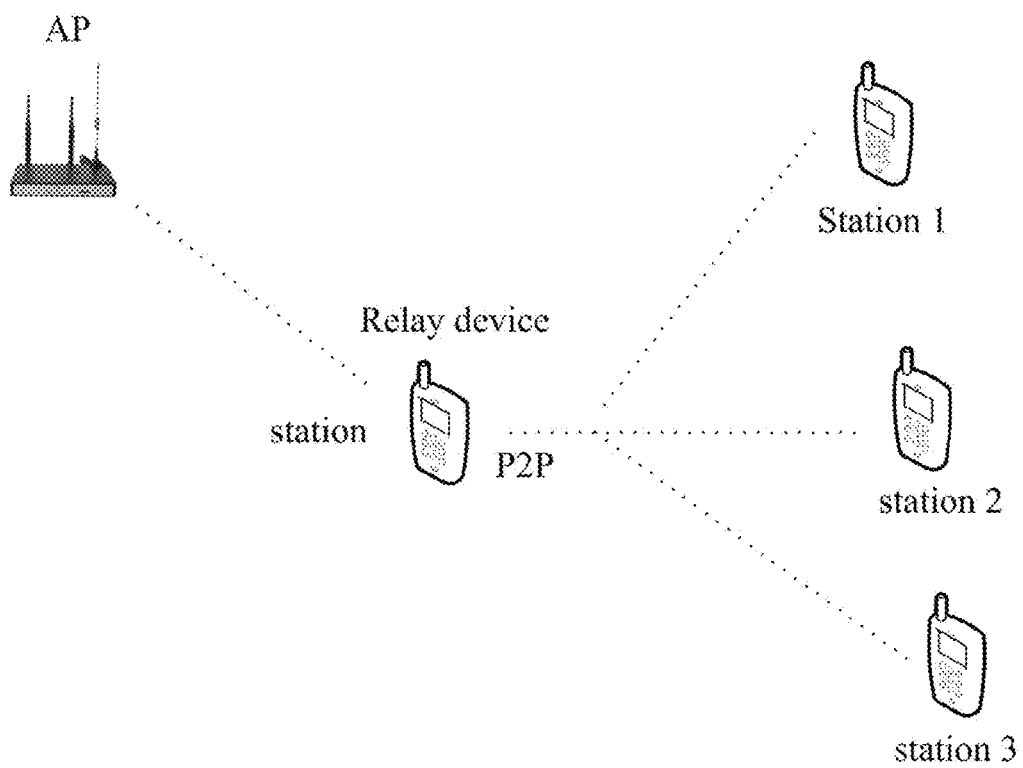
FIG. 2 is a topology diagram of a relay system according to the application.

As illustrated in FIG. 2, the AP is such a specific node in a wireless network that can connect to a base station, and through which another type of node in the wireless network can communicate with another device outside or inside the wireless network.

Wi-Fi inbuilt in the mobile device typically functions as a station node or a soft AP node, or a P2P, Peer-to-Peer, node.

Particularly the station node refers to such a device connecting with the wireless network that can communicate with another device inside or outside the wireless network through a wireless access point.

The soft AP node refers to the mobile device functioning as a wireless access point so that the soft AP-enabled mobile device can act as a router enabling an access of another station to the wireless network.

P2P, also referred to as Wi-Fi Direct, and the P2P node can enable two Wi-Fi devices to be connected directly with and to communicate with each other without any wireless access point.

In the embodiment of the present application, whether a station node connects with a wireless access point can be determined by invoking the getWifiState( ) function in WifiManager to determine whether the mobile device is enabled as a Wi-Fi station node.

If a station node being started is detected, then the API interface getNetworkInfo( ) available from ConnectivityManager can be invoked by inputting ConnectivityManager.TYPE_WIFI as a parameter thereto to determine whether the station node connects with a wireless access point.

If the returned NetworkInfo object is not Null, and isConnected( ) is true, then it will be determined that the station node connects with an external wireless access point.

If it is determined that the station node connects with a wireless access point, then it will be determined that the mobile device connects with the wireless access point.

If it is determined that no station node is started or the station node does not connect with any external wireless access point, then an instruction will be generated that Connect to a Wireless Access Point, e.g., "Enable Wi-Fi and connect to a router".

In the step 102, a relay instruction is sent to a Wi-Fi module inbuilt in the mobile device through a P2P node of Wi-Fi, wherein the P2P node is inbuilt in the mobile device, so that logon information of the mobile device is broadcasted, and one or more external electronic devices connect with the mobile device through the P2P node.

As illustrated in FIG. 2, if the Wi-Fi station node connects with an active external wireless access point, then a relay instruction can be sent to the Wi-Fi module to start Wi-Fi relaying.

Particularly the Wi-Fi module, also referred as a serial interface Wi-Fi module, at the transport layer of the Internet of Things can be an embedded module, including an inbuilt wireless network protocol IEEE 802.11b.g.n protocol stack and a TCP/IP protocol stack, configured to convert a serial interface or TTL level in compliance with a Wi-Fi wireless network communication standard.

A hardware device in which the Wi-Fi module is embedded can connect to the Internet directly using Wi-Fi, which is an important component to enable wireless intelligent home, Machine to Machine (M2M), and other Internet of Things applications.

In an embodiment of the present application, the step 102 can include the following sub-steps:

The sub-step S11 is to detect a first channel, over which the station node connects with the external wireless access point;

The sub-step S12 is to calculate a second channel which does not interfere with the first channel;

The sub-step S13 is to obtain the logon information of the logging mobile device, where the logon information includes a Service Set Identifier (SSID) and a password; or alternatively, firstly the sub-step S13 and then the sub-step S12 can be performed, or both of the sub-steps S12 and S13 can be performed concurrently;

The sub-step S14 is to calculate a first length of the SSID, and a second length of the password; and to encapsulate the second channel, the SSID, the first length, the password, and the second length in the relay instruction;

The sub-step S15 is to send the relay instruction to the Wi-Fi module through the P2P node in a group mode, so that the SSID at the first length is to be broadcasted over the second channel, where in the group mode of P2P, a plurality of Wi-Fi devices communicate with each other by enabling their P2P functions, without any wireless access point, to thereby constitute a network which is a P2P network in which the devices can only communicate inside the network, and these communicating devices constitute a P2P group.

If the station node of Wi-Fi is started and connects with the external wireless access point, then the first channel with which the station node connects with the external wireless access point can be obtained, and if P2P node is enabled, then a command over the second channel without interference from and to the station node can be sent.

In the Android system, WifiService is responsible for core services of the Wi-Fi function, and particularly the WiFiStateMachine sub-system is responsible for maintaining various state information of Wi-Fi.

The state information includes channel information of the wireless access point, so the first channel with which the station node connects with the external wireless access point can be obtained by invoking the mWifiStateMachine.fetch-FrequencyNative( ) function of the system.

Frequencies of different channels are as follows:

Freq=2412 (Channel 1) Freq=2417 (Channel 2) Freq=2422 (Channel 3)
Freq=2427 (Channel 4) Freq=2432 (Channel 5) Freq=2437 (Channel 6)
Freq=2442 (Channel 7) Freq=2447 (Channel 8) Freq=2452 (Channel 9)
Freq=2457 (Channel 10) Freq=2462 (Channel 11) Freq=2467 (Channel 12)
Freq=2472 (Channel 13)

For the relay function to be enabled, typically the first channel of the station node and the second channel of P2P node shall not interfere with each other; otherwise, the relay function may forward data poorly and relay at degraded performance due to interference between the channels.

For a type of channel in the 2.4G band, the second channel can be a channel shifted at least 5 channels from the first channel.

If X represents the first channel with which the station node inbuilt in the mobile device connects with the external wireless access point, and Y represents the second channel of the relay device (i.e., the mobile device), then both of them will satisfy the following relationship:

$Y \geq X+5$ or $Y \leq X-5$;

Where X and Y are positive integers, and if Y<1 or Y>13, then Y will be invalidated and rejected.

For a type of channel in the 5G band, the second channel is a channel different from the first channel.

Then the user is asked in a User Interface (UI) to enter the SSID and the password of the relay device (i.e., the mobile device).

If the user enters the SSID and the password on the UI, then the SSID and the password will be applied; otherwise, a default SSID and a default password will be applied.

The first length of the SSID and the second length of the password are calculated for the relay instruction to be sent.

There are two existing P2P modes including a P2P group mode and a P2P client.

The P2P group mode is as described above. Before a P2P group is created, all the smart terminals are respective P2P devices. After these P2P devices negotiate about P2P, one of the devices plays the role of a Group Owner (GO) (i.e., acts as an AP), and the other devices play the role of clients, that is, the other devices operate in the P2P client mode.

The original P2P group function is:

p2p_ctrl_group_add(struct wpa_supplicant *wpa_s, char *cmd)

In this P2P group function, none of the channel, the SSID, the password, and the other parameters can be transmitted.

In the embodiment of the present application, the Wi-Fi protocol stack is modified by forcibly setting the P2P mode to the group mode in which the SSID and the password can be set as desirable to the user so that the mobile device which acts as a relay device can be scanned and identified by an external electronic device using the SSID, and communication can be secured using the password.

The P2P_GROUP_ADD instruction is extended in the Wi-Fi protocol stack Wpa_supplicant of the system:

wpas_p2p_group_add_with_ssid(wpa_s, 1, freq, ht40, ssid, passphrase, ssid_len, passphrase_len)

Where freq represents the second channel, ssid len represents the first length, passphrase represents the password, and passphrase len represents the second length.

The channel, the SSID, the password, and the other parameters can be sent in the extended P2P group function.

After the relay instruction is sent, the mobile device which is a relay device sends a broadcast frame carrying the SSID, and the other electronic device can scan and locate the relay device and then connect to the relay device using the SSID and the password.

In the step 103, a packet forwarding function is enabled so that a data packet is forwarded between the different nodes of Wi-Fi, which are inbuilt in the mobile device;

The packet forward function can be enabled using the echo attribute value.

echo 1 >/proc/sys/net/ipv4/ip_forward

Packet forwarding refers to forwarding a packet from one device to another device.

In the embodiment of the present application, the packet forwarding function can be enabled to forward a data packet between the station node and the P2P node.

In the step 104, configuration information of packet forwarding is sent to the Wi-Fi module so that a data packet is forwarded between the station node and the P2P node.

In a real application, the address table service iptables of the system can be invoked to send a routing table to the Wi-Fi module, where the routing table includes a route between a first IP address of the P2P node, and a second IP address of the station node; and The address table service iptables of the system can be invoked to send configuration information of the Network Address Translation (NAT) function to the Wi-Fi module, where the source IP address and the destination IP address of the IP packet are modified automatically by the NAT function to translate the first IP address of the P2P node.

Of course a prior routing table can be further removed before the routing table and the NAT function are sent.

The configuration information of iptables and NAT is as follows:

remove old rules (The prior routing table is removed)
iptables -F
iptables -t filter -F
iptables -t nat -F
Bring up NAT rules
iptables -t nat -A POSTROUTING -s 192.168.49.0/24 -d 0.0.0.0/0 -j MASQUERADE Particularly if the IP segment of the relay device (i.e., the mobile device) is 192.168.49.0, then "Bring up NAT rules" can be sent to re-encapsulate and de-encapsulate the data packet with the source address being the network segment of 192.168.49.0/24 Aby translating the source address into 0.0.0.0/0, and to forward the data packet to the station node.

In an embodiment of the present application, the method can further include the following step:

In the step 105, configuration information of a Domain Name System (DNS) is sent to the Wi-Fi module so that the data packet received by the P2P node is forwarded.

The address table service iptables in the system can be invoked to send the address of a gateway of the DNS in the Transport Control Protocol (TCP) to the Wi-Fi module;

The command format is:

iptables -t nat -I PREROUTING (the name of the relay device) -p tcp -dport 53 -j DNAT -to-destination (the router gateway)

Alternatively the address table service iptables in the system can be invoked to send the address of the gateway of the DNS in the open system internet protocol User Datagram Protocol (UDP) to the Wi-Fi module;

The command format is:
iptables -t nat -I PREROUTING (the name of the relay device) -p udp -dport 53 -j DNAT -to-destination (the router gateway)

As described above, the DNS gateway addresses in the TCP and the UDP are configured to the relay device (i.e., the mobile device), and after the DNSs are configured, the input IP address is parsed by the DNS server for communication over the network.

In the embodiment of the present application, the mobile device connects to the external wireless access point through the inbuilt station node for communication, and connects to the external electronic device through the P2P node inbuilt in the mobile device for communication, and forwards data packets through the P2P node between the station node and the external electronic device connecting with the P2P node, so that the relay function can be enabled in the mobile device; and since the mobile device has been widely popularized, the existing mobile device can be reused as a relay to thereby avoid additional hardware from being configured, so as to greatly lower the cost, and also since no fixed power source receptacle is required to power the mobile device, the well-portable mobile device can be adjusted in position to the strength of the signal to thereby greatly enhance the relayed wireless signal.

Figure 3:
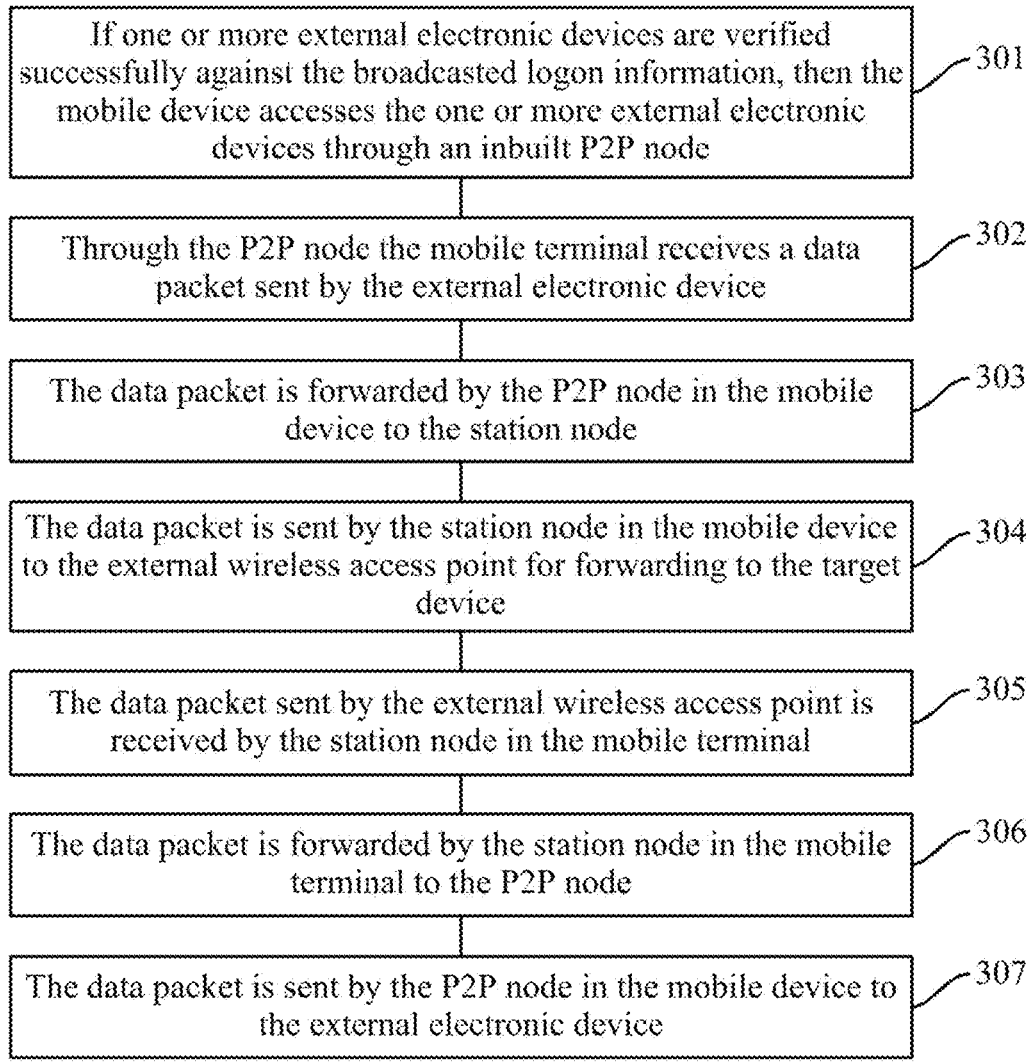
FIG. 3 is a flow chart of a process of some other embodiments of a method for relaying by a mobile device according to the present application.

Referring to FIG. 3, there is illustrated a flow chart of a process of some other embodiments of a method for relaying by a mobile device according to the present application, where the method can include the following steps:

In the step 301, if one or more external electronic devices are verified successfully against the broadcasted logon information, then the mobile device connects to the one or more external electronic devices through an inbuilt P2P node.

The relay device (i.e., the mobile device) can be regarded as a wireless access point to broadcast a beacon frame periodically so that another station device scanning and locating the beacon frame can be provided with an SSID of the relay device (i.e., the mobile device).

If a request sent by the one or more external electronic devices for a service set identifier in the logon information is received, then a response message of Challenge Text is returned to the one or more external electronic devices;

If a connection request sent by the one or more external electronic devices is received, then a password in the connection request is verified for consistency with a password in the logon information according to a second length of the password in the logon information; and If the passwords are consistent, then the one or more external electronic devices connect to the mobile device, e.g., electronic devices of Station 1, Station 2, and Station 3 as illustrated in FIG. 2.

In the step 302, through the P2P node the mobile device receives a data packet sent by the external electronic device.

If the connected electronic device communicates with the external target device, then the electronic device will send the data packet to the mobile device which is a relay device.

In the step 303, the data packet is forwarded by the P2P node in the mobile device to the station node;

It is determined whether a source address of the data packet is a first IP address of the P2P node, e.g., 192.168.49.0, and if so, then the first IP address is configured into a destination IP address of 0.0.0.0 based upon configuration information of NAT; and A routing table is searched for a second IP address corresponding to the first IP address, and since a packet forwarding function is enabled in advance, a converted data packet from the destination IP address is forwarded to the station node at the second IP address.

In the step 304, the data packet is sent by the station node in the mobile device to the external wireless access point for forwarding to the target device;

In a real application, the data packet includes Uniform Resource Locator (URL) information, and the wireless access point maps the URL information to an IP address through a Domain Name System (DNS), and forwards the data packet to the target device at the IP address, e.g., a web server, through the base station illustrated in FIG. 2.

It shall be noted that the station node operates over a first channel, and the P2P node operates over a second channel, thus avoiding interference to each other.

In the step 305, the data packet sent by the external wireless access point is received by the station node in the mobile device.

If the external target device communicates with the external electronic device connecting with the mobile device, then the target device will send a data packet to the mobile device which is a relay device, through the base station.

In the step 306, the data packet is forwarded by the station node in the mobile device to the P2P node;

If the second IP address of the station node from which the data packet originates is determined, and the routing table is searched for the first IP address corresponding to the second IP address, then the data packet is forwarded to the P2P node at the first IP address.

In the step 307, the data packet is sent by the P2P node in the mobile device to the external electronic device.

The relay device (i.e., the mobile device) sends the data packet of the external target device to the external electronic device connecting with the relay device, through the P2P node in the mobile device to thereby relay the data packet.

It shall be noted that the station node operates over the first channel, and the P2P node operates over the second channel, thus avoiding interference to each other.

It shall be noted that for the sake of a concise description, the embodiments of the method have been described as a series of actions in combination, but those skilled in the art shall appreciate that the embodiment of the present application will not be limited to the described order of the actions because some of the steps may be performed in another order or concurrently dependent upon the embodiments of the present application. Secondly those skilled in the art shall also appreciate that all the embodiments described here are preferred embodiments, but all the actions involved in the embodiments may not necessarily be necessary to the embodiments of the present application.

Figure 4:
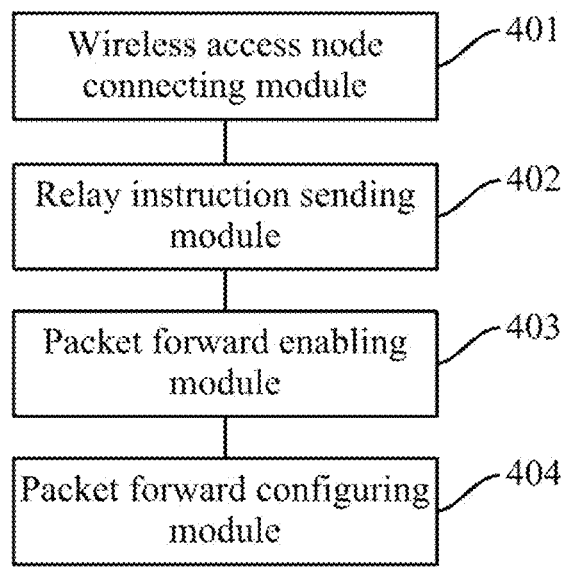
FIG. 4 is a structural block diagram of an embodiment of an apparatus for relaying by a mobile device according to the present application.

Referring to FIG. 4, there is illustrated a structural block diagram of an embodiment of an apparatus for relaying by a mobile device according to the present application, applicable to the mobile device, where the apparatus can include the following modules:

A wireless access node connecting module 401 is configured to connect to an external wireless access point through a station node of Wi-Fi, wherein the station node is inbuilt in the mobile device;

A relay instruction sending module 402 is configured to send a relay instruction to a Wi-Fi module inbuilt in the mobile device through a P2P node of Wi-Fi, wherein the P2P node is inbuilt in the mobile device so that logon information of the mobile device is broadcasted by the Wi-Fi module, and one or more external electronic devices connect with the mobile device through the P2P node;

A packet forward enabling module 403 is configured to enable a packet forward function so that a data packet is forwarded between the different nodes of Wi-Fi, which are inbuilt in the mobile device; and A packet forward configuring module 404 is configured to send configuration information of packet forwarding to the Wi-Fi module so that a data packet is forwarded between the station node and the P2P node.

In an embodiment of the present application, the apparatus can further include the following module:

A DNS configuring module is configured to send configuration information of a Domain Name System (DNS) to the Wi-Fi module so that a data packet received by the P2P node is forwarded.

In an embodiment of the present application, the wireless access node connecting module 401 can include the following sub-modules:

An enabled Wi-Fi detecting sub-module is configured to determine whether the station node of Wi-Fi inbuilt in the mobile device is enabled;

A connected wireless access point detecting sub-module is configured to determine whether the station node connects with the external wireless access point, when it is determined that the station node is enabled;

A connection determining sub-module is configured to determine that the mobile device connects with the external wireless access point, when it is determined that the station node connects with the external wireless access point; and An instruction generating sub-module is configured to generate an instruction to connect to the wireless access point, when it is determined that the station node is not started or does not connect with the external wireless access point.

In an embodiment of the present application, the relay instruction sending module 402 can include the following sub-modules:

A channel detecting sub-module is configured to detect a first channel, over which the station node connects with the external wireless access point;

A channel calculating sub-module is configured to calculate a second channel which does not interfere with the first channel;

A logon information obtaining sub-module is configured to obtain the logon information of the logging mobile device, where the logon information includes a service set identifier and a password;

A length calculating sub-module is configured to calculate a first length of the service set identifier, and a second length of the password;

A relay instruction encapsulating sub-module is configured to encapsulate the second channel, the service set identifier, the first length, the password, and the second length in the relay instruction; and A group broadcasting sub-module is configured to send the relay instruction to the Wi-Fi module through the P2P node in a group mode, so that the SSID at the first length is to be broadcasted over the second channel through the Wi-Fi module.

In an embodiment of the present application, the packet forward configuring module 404 can include the following sub-modules:

A routing table sending sub-module is configured to send a routing table to the Wi-Fi module, where the routing table includes a route between a first IP address of the P2P node, and a second IP address of the station node; and An NAT sending sub-module is configured to send configuration information of a Network Address Translation (NAT) function to the Wi-Fi module so that the first IP address of the P2P node is translated.

In an embodiment of the present application, the DNS configuring module can include the following sub-modules:

A TCP configuration sending sub-module is configured to send the address of a gateway of the Domain Name System (DNS) in the TCP to the Wi-Fi module; and A UDP configuration sending sub-module is configured to send the address of the gateway of the Domain Name System (DNS) in the UDP to the Wi-Fi module.

In an embodiment of the present application, the apparatus can further include the following module:

A device accessing module is configured, if one or more external electronic devices are verified successfully against the broadcasted logon information, to have the one or more external electronic devices connect with the P2P node.

In an embodiment of the present application, the device accessing module can further include the following sub-modules:

A responding sub-module is configured, if a request sent by the one or more external electronic devices for a service set identifier in the logon information is received, to return a response message to the one or more external electronic devices;

A verifying sub-module is configured, if a connection request sent by the one or more external electronic devices is received, to verify a password in the connection request for consistency with a password in the logon information according to a second length of the password in the logon information; and if so, to invoke an accessing sub-module; and the accessing sub-module is configured to have the one or more external electronic device connect with the P2P node.

In an embodiment of the present application, the apparatus can further include the following modules:

A first data packet receiving module is configured to receive in the P2P node a data packet sent by an external electronic device;

A first data packet forwarding module is configured to forward the data packet from the P2P node to the station node; and A first data packet sending module is configured to send the data packet in the station node to the external wireless access point so that the data packet is to be forwarded to a target device.

The data packet includes Uniform Resource Locator (URL) information, and the wireless access point maps the URL information to an IP address through a Domain Name System (DNS), and forwards the data packet to the target device at the IP address.

In an embodiment of the present application, the first data packet forwarding module can include the following sub-modules:

An IP address determining sub-module is configured to determine whether a source address of the data packet is a first IP address of the P2P node; and if so, to invoke a translating sub-module;

The translating sub-module is configured to translate the first IP address into a target IP address;

A first routing table searching sub-module is configured to search a routing table for a second IP address corresponding to the first IP address; and A first forwarding sub-module is configured to forward a converted data packet from the target IP address to the station node at the second IP address.

In an embodiment of the present application, the apparatus can further include the following modules:

A second data packet receiving module is configured to receive in the station node a data packet sent by the external wireless access point;

A second data packet forwarding module is configured to forward the data packet from the station node to the P2P node; and A second data packet sending module is configured to send the data packet in the P2P node to an external electronic device.

In an embodiment of the present application, the second data packet forwarding module can include the following sub-modules:

An IP address determining sub-module is configured to determine a second IP address of a station node from which the data packet originates;

A second routing table searching sub-module is configured to search a routing table for a first IP address corresponding to the second IP address; and A second forwarding sub-module is configured to forward the data packet to the P2P node at the first IP address.

Since the embodiments of the apparatus are substantially similar to the embodiments of the method, the embodiments of the apparatus have been described in brief, and reference can be made to the description of the embodiments of the method for details of the embodiments of the apparatus.

Figure 5:
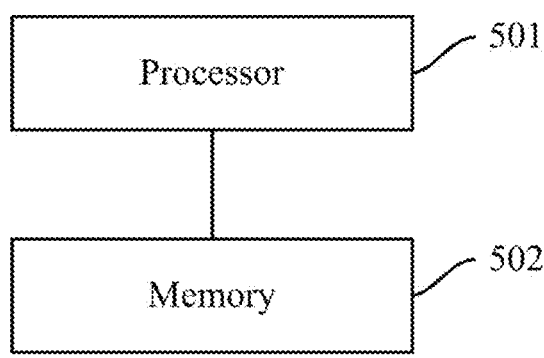
FIG. 5 is a structural block diagram of an embodiment of an apparatus for relaying by a mobile device according to the present application.

Based upon the same inventive idea, an embodiment of the present application further provides an apparatus for relaying by a mobile device, applicable to the mobile device, where as illustrated in FIG. 5, the apparatus can include:

A processor 501; and

A memory 502 storing at least one instruction configured to be executed by the processor 501: to connect to an external wireless access point through a station node of Wi-Fi, wherein the station node is inbuilt in the mobile device; to send a relay instruction to a Wi-Fi module inbuilt in the mobile device through a P2P node of Wi-Fi, wherein the P2P node is inbuilt in the mobile device so that logon information of the mobile device is broadcasted, and one or more external electronic devices connect with the mobile device through the P2P node; to enable a packet forward function so that a data packet is forwarded between the different nodes of Wi-Fi, which are inbuilt in the mobile device; and to send configuration information of packet forwarding to the Wi-Fi module so that a data packet is forwarded between the station node and the P2P node.

Furthermore the at least one instruction is further configured to be executed by the processor 501: to send configuration information of a Domain Name System (DNS) to the Wi-Fi module so that a data packet received by the P2P node is forwarded.

Where the at least one instruction configured to be executed by the processor 501 to connect the mobile device with the external wireless access point through the station node of Wi-Fi is configured to determine whether the station node of Wi-Fi is enabled in the mobile device; to determine whether the station node connects with the external wireless access point, upon determining that the station node is enabled; to determine that the mobile device connects with the external wireless access point, upon determining that the station node connects with the external wireless access point; and to generate an instruction indicating to connect to the wireless access point, upon determining that the station node is not started or does not connect with the external wireless access point.

Where the at least one instruction configured to be executed by the processor 501 to send the relay instruction to the Wi-Fi module through the P2P node of Wi-Fi is configured: to detect a first channel, over which the station node connects with the external wireless access point; to calculate a second channel which does not interfere with the first channel; to obtain the logon information of the logging mobile device, where the logon information includes a service set identifier and a password; to calculate a first length of the service set identifier, and a second length of the password; to encapsulate the second channel, the service set identifier, the first length, the password, and the second length in the relay instruction; and to send the relay instruction to the Wi-Fi module through the P2P node in a group mode, so that the service set identifier at the first length is to be broadcasted over the second channel.

Where the at least one instruction configured to be executed by the processor 501 to send the configuration information of packet forwarding to the Wi-Fi module is configured: to send a routing table to the Wi-Fi module, where the routing table includes a route between a first IP address of the P2P node, and a second IP address of the station node; and to send configuration information of a Network Address Translation (NAT) function to the Wi-Fi module so that the first IP address of the P2P node is translated.

Where the at least one instruction configured to be executed by the processor 501 to send the configuration information of the DNS to the Wi-Fi module through the P2P node of Wi-Fi is configured: to send the address of a gateway of the DNS in the TCP to the Wi-Fi module; and to send the address of the gateway of the DNS in the UDP to the Wi-Fi module.

Where the at least one instruction is further configured to be executed by the processor 501: if one or more external electronic devices are verified successfully against the broadcasted logon information, to have the one or more external electronic devices connect with the P2P node.

Where the at least one instruction configured to be executed by the processor 501, if the one or more external electronic devices are verified successfully against the broadcasted logon information, to have the one or more external electronic devices connect with the P2P node is configured: if a request sent by the one or more external electronic devices for a service set identifier in the logon information is received, to return a response message to the one or more external electronic devices; if a connection request sent by the one or more external electronic devices is received, to verify a password in the connection request for consistency with a password in the logon information according to a second length of the password in the logon information; and if the passwords are consistent, to have the one or more external electronic device connect with the P2P node.

Where the at least one instruction is further configured to be executed by the processor 501: to receive in the P2P node a data packet sent by an external electronic device; to forward the data packet from the P2P node to the station node; and to send the data packet in the station node to the wireless access point for forwarding to a target device.

Where the at least one instruction is further configured to be executed by the processor 501 so that the data packet includes Uniform Resource Locator (URL) information, and the wireless access point maps the URL information to an IP address through a Domain Name System (DNS), and forwards the data packet to the target device at the IP address.

Where the at least one instruction configured to be executed by the processor 501 to forward the data packet from the P2P node to the station node is configured: to determine whether a source address of the data packet is a first IP address of the P2P node; and if so, to translate the first IP address into a target IP address; to search a routing table for a second IP address corresponding to the first IP address; and to forward a converted data packet from the target IP address to the station node at the second IP address.

Where the at least one instruction is further configured to be executed by the processor 501: to receive in the station node a data packet sent by the external wireless access point; to forward the data packet from the station node to the P2P node; and to send the data packet in the P2P node to an external electronic device.

Where the at least one instruction configured to be executed by the processor 501 to forward the data packet from the station node to the P2P node is configured: to determine a second IP address of a station node from which the data packet originates; to search a routing table for a first IP address corresponding to the second IP address; and to forward the data packet to the P2P node at the first IP address.

Figure 6:
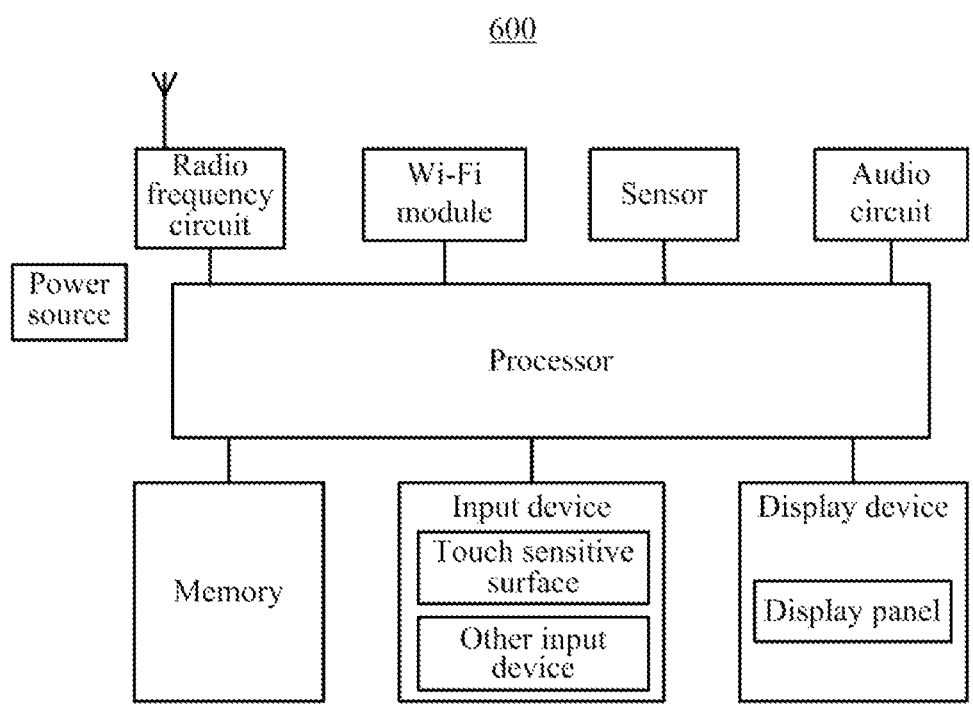
FIG. 6 is a structural block diagram of a mobile terminal, to which the apparatus as illustrated in FIG. 5 is applied, according to the present application.

As illustrated in FIG. 6, a terminal 600 to which the apparatus as illustrated in FIG. 5 is applied can be any one of various handheld devices (e.g., a handset, a tablet computer, a PDA, a smart wearable device, etc.), and can include a processor including one or more processing cores, a radio frequency circuit, a memory including one or more computer readable storage mediums, an input device, a display device, a sensor, an audio circuit, a power source, and other components, where the processor can be the processor 501 as illustrated in FIG. 5, or a processor performing at least the function of the processor 501 as illustrated in FIG. 5, and the memory can be the memory 502 as illustrated in FIG. 5, or a memory performing at least the function of the memory 502 as illustrated in FIG. 5. Those skilled in the art can appreciate that the terminal 600 in this embodiment will not be limited to the structure as illustrated, but can include more or less components or some of the components can be combined or different components can be arranged, where:

The radio frequency circuit can be configured to receive and transmit a signal in receiving and transmitting information or in communication, and particularly to receive and then pass downlink information of a base station to the one or more processors for processing; and to send uplink data to the base station. Typically the radio frequency circuit includes but will not be limited to an antenna, at least one amplifier, a tuner, one or more oscillators, a Subscriber Identifier Module (SIM) card, a transducer, a coupler, a Low Noise Amplifier (LNA), a duplexer, etc. Moreover the radio frequency circuit can further communicate wirelessly with a network and another device in any one of communication standards or protocols including but not limited to a Global System of Mobile communication (GSM), a General Packet Radio Service (GPRS), a Code Division Multiple Access (CDMA), a Wideband Code Division Multiple Access (WCDMA), a Long Term Evolution (LTE), an e-mail, a Short Messaging Service (SMS), etc.

The memory can be configured to store software programs and modules, and the processor is configured to run the software programs and modules stored in the memory to thereby perform various function applications and data processing. The memory can generally include a program storage area and a data storage area, where an operating system, applications required for at least one function (e.g., an audio playing function, an image playing function, etc.), etc., can be stored in the program storage area; and data created for use of the terminal 600 (e.g., audio data, an address book, etc.), etc., can be stored in the data storage area. Moreover the memory can include a high-speed random access memory, and can further include a nonvolatile memory, e.g., at least one magnetic disks memory device, a flash memory device or another volatile solid memory device. Correspondingly the memory can further include a memory controller configured to provide an access of the processor and the input device to the memory.

The input device can be configured to receive input digital or character information and to generate a keyboard, mouse, joystick, optical or track ball signal input related to user setting and function control. The input device can include a touch sensitive surface and another input device. The touch surface, also referred to as a touch display screen or a touch control panel, can collect a touch operation by a user thereon or in proximity thereto (e.g., an operation by the user using a finger, a touch pen or any other appropriate object or attachment on or in proximity to the touch sensitive surface) and drive a corresponding connected device by a preset program. Optionally the touch sensitive surface can include two components of a touch detection device and a touch controller, where the touch detection device detects the position of touching by the user, and detects a signal as a result of the touch operation and transfers the signal to the touch controller; and the touch controller receives the touch signal from the touch detection device, and converts it into coordinates of a touch point and further transfers them to the processor, and can receive and execute a command sent by the processor. Moreover the touch sensitive surface can be embodied in various types of resistive, capacitive, infrared, surface sound wave and other types. The input device can further include another input device in addition to the touch sensitive surface. Particularly the other input device can include but will not be limited to one or more of a physical keyboard, functional keys (e.g., volume control buttons, a power button, etc.), a track ball, a mouse, a joystick, etc.

The display unit can be configured to display information entered by the user or information provided to the user and various graphic user interfaces of the terminal 600, where these graphic user interfaces can be composed of graphics, texts, icons, videos or any combination thereof. The display unit can include a display panel, and optionally the display panel can be configured in the form of a Liquid Crystal Display (LCD), an Organic Light-Emitting Diode (OLED) display, etc. Furthermore the touch sensitive surface can overlie the display panel, and the touch sensitive surface detecting the touch operation thereon or in proximity thereto transfers it to the processor to determine the type of the touch event, and thereafter the processor provides a corresponding visual output on the display panel according to the type of the touch event. Although the touch sensitive surface and the display panel are embodied in this embodiment as two separate components to perform the input and output functions, the touch sensitive surface and the display panel can be integrated to perform the input and output functions in some embodiments.

The terminal 600 can further include at least one sensor, e.g., an optical sensor, a motion sensor and other sensors. The optical sensor can include an ambient optical sensor and a proximity sensor, where the ambient optical sensor can adjust the brightness of the display panel according to the illumination of ambient light rays, and the proximity sensor can disable the display panel and/or a backlight when the terminal 600 moves in proximity to an ear. A gravity acceleration sensor which is a motion sensor can detect the magnitudes of accelerations in respective directions (typically three axes), and can detect the magnitude and the direction of gravity when the sensor is stationary and can be configured to perform applications of identifying the posture of a handset (e.g., switching between landscape and portrait modes, relevant games, calibration of the posture of a magnetometer, etc.), a relevant function of identifying vibration (e.g., a pedometer, a knock, etc.), etc.; and the terminal 600 can be further configured with a gyroscope, a barometer, a hygrometer, a thermometer, an infrared sensor and other sensors, and a repeated description of these components will be omitted here.

The audio circuit, a speaker and a transducer can provide an audio interface between the user and the terminal 600. The audio circuit can receive and convert audio data into an electric signal and transmit the electric signal to the speaker, which is converted by the speaker into an audio signal for output; and on the other hand, the transducer converts a collected audio signal into an electric signal which is received by the audio circuit and then converted into audio data, and the audio data is further output to the processor for processing and then transmitted by the radio frequency circuit to another device, for example, or the audio data is output to the memory for further processing. The audio circuit may further include an earphone jack for communication between an external earphone and the terminal.

The processor is a control center of the terminal 600, has the respective components connected by various interfaces and lines, and runs or executes the software programs and/or modules stored in the memory and invokes the data stored in the memory to perform the various functions of the terminal 600 and process the data to thereby manage and control the terminal 600 as a whole. Optionally the processor can include one or more processing cores; and preferably the processor can be integrated with an application processor and a modem processor, where the application processor generally handles the operating system, the user interfaces, the applications, etc., and the modem processor generally handles wireless communication. As can be appreciated, the modem processor may not be integrated into the processor.

The terminal 600 further includes a power source (e.g., a battery) powering the respective components, and preferably the power source can be logically connected with the processor through a power management system to thereby perform charging and discharging management, power consumption management, and other functions through the power management system. The power source can further include one or more DC or AC power sources, recharging systems, power source failure detection circuits, power source transformers or inverters, power source status indicators, and other any appropriate components.

Although not illustrated, the terminal 600 can further include a camera, a Bluetooth module, etc., and a repeated description thereof will be omitted here. Particularly in this embodiment, the display device of the terminal 600 is a touch screen display, and the terminal 600 further includes a memory in which one or more programs are stored and configured to be executed by the one or more processors.

The respective embodiments in the description have been described progressively, and each of the embodiments has been focused on its differences from the other embodiments, and the description of their commonalities can be applied tp each other.

Those skilled in the art shall appreciate that the embodiments of the present application can be embodied as a method, a system or a computer program product. Therefore the present application can be embodied in the form of an all-hardware embodiment, an all-software embodiment or an embodiment of software and hardware in combination. Furthermore the present application can be embodied in the form of a computer program product embodied in one or more computer useable storage mediums (including but not limited to a disk memory, a CD-ROM, an optical memory, etc.) in which computer useable program codes are contained.

The present application has been described in a flow chart and/or a block diagram of the method, the device (system) and the computer program product according to the embodiments of the present application. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

It shall be further noted that such relationship terms in this context as first and second, etc., are merely intended to distinguish one entity or operation from another entity or operation but not necessarily intended to require or suggest any such a real relationship or order between these entities or operations. Furthermore the terms "include", "comprise" and any variants thereof are intended to encompass nonexclusive inclusion so that a process, a method, an article or a device including a series of elements includes both those elements and one or more other elements which are not listed explicitly or one or more elements inherent to the process, the method, the article or the device. Unless stated otherwise, an element being defined in the sentence "include/comprise a(n) . . . " will not exclude the presence of one or more additional identical element in the process, the method, the article or the device including the element.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A mobile device comprising:
a processor; and
a memory storing at least one instruction, the processor configured to execute the at least one instruction to:
connect to an external wireless access point through a station node of Wi-Fi, wherein the station node is inbuilt in the mobile device;
send a relay instruction to a Wi-Fi module inbuilt in the mobile device through a P2P node of Wi-Fi so that logon information of the mobile device is broadcasted, and one or more external electronic devices connect with the mobile device through the P2P node based on the logon information, wherein the P2P node is inbuilt in the mobile device;
enable a packet forward function to support forwarding of a data packet between different nodes of Wi-Fi that are inbuilt in the mobile device;
send a routing table for packet forwarding to the Wi-Fi module, wherein the routing table comprises a route between a first IP address of the P2P node and a second IP address of the station node; and
send configuration information of a network address translation (NAT) function to the Wi-Fi module so that the first IP address of the P2P node is translated and a data packet is forwarded between the station node and the P2P node.

2. The mobile device according to claim 1, wherein the processor is further configured to execute the at least one instruction:
send configuration information of a Domain Name System (DNS) to the Wi-Fi module so that a data packet received by the P2P node from the one or more electronic devices is forwarded.

3. The mobile device according to claim 1, wherein the processor is further configured to execute the at least one instruction to:
in response to the one or more external electronic devices being verified successfully against the broadcasted logon information, have the one or more external electronic devices connect with the P2P node.

4. The mobile device according to claim 3, wherein the processor is further configured to execute the at least one instruction to:
receive, by the P2P node, a data packet from an external electronic device;
forward the data packet from the P2P node to the station node; and
send the data packet from the station node to the external wireless access point for forwarding to a target device.

5. The mobile device of according to claim 3, wherein the processor is further configured to execute the at least one instruction to:
receive, by the station node, a data packet from the external wireless access point;
forward the data packet from the station node to the P2P node; and
send the data packet from the P2P node to an external electronic device.

6. A method for relaying by a mobile device, the method comprising:
connecting, by a station node of Wi-Fi, to an external wireless access point, wherein the station node is inbuilt in the mobile device;
sending, by a P2P (Peer-to-Peer) node of Wi-Fi, a relay instruction to a Wi-Fi module inbuilt in the mobile device, so that logon information of the mobile device is broadcasted, and one or more external electronic devices connect with the mobile device through the P2P node based on the logon information, wherein the P2P node is inbuilt in the mobile device;
enabling, by the mobile device, a packet forward function to support forwarding of a data packet between different nodes of Wi-Fi that are inbuilt in the mobile device;
sending, by the mobile device, a routing table for packet forwarding to the Wi-Fi module, wherein the routing table comprises a route between a first IP address of the P2P node and a second IP address of the station node; and
sending, by the mobile device, configuration information of a network address translation (NAT) function to the Wi-Fi module so that the first IP address of the P2P node is translated and a data packet is forwarded between the station node and the P2P node.

7. The method according to claim 6, wherein after the routing table and configuration information of the NAT function are sent to the Wi-Fi module, the method further comprises:
sending, by the mobile device, configuration information of a Domain Name System (DNS) to the Wi-Fi module so that a data packet received by the P2P node from the one or more external electronic devices is forwarded.

8. The method according to claim 7, wherein sending, by the mobile device, configuration information of the DNS to the Wi-Fi module comprises:
sending an address of a gateway of the DNS in a Transport Control Protocol (TCP) to the Wi-Fi module; and
sending the address of the gateway of the DNS in a User Datagram Protocol (UDP) to the Wi-Fi module.

9. The method according to claim 6, wherein sending, by the P2P node of Wi-Fi, the relay instruction to the Wi-Fi module inbuilt in the mobile device comprises:
detecting a first channel, over which the station node is connected with the external wireless access point;
calculating a second channel that does not interfere with the first channel;
obtaining the logon information of the mobile device, wherein the logon information comprises a service set identifier and a password;
calculating a first length of the service set identifier, and a length of the password;
encapsulating information associated with the second channel, the service set identifier, the first length of the service set identifier, the password, and the length of the password, in the relay instruction; and
sending the relay instruction to the Wi-Fi module through the P2P node in a group mode to broadcast the service set identifier at the first length over the second channel.

10. The method according to claim 6, wherein the method further comprises:
in response to one or more external electronic devices being verified successfully against the broadcasted logon information, having the one or more external electronic devices connect with the P2P node.

11. The method according to claim 10, wherein having the one or more external electronic devices connect with the P2P node comprises:
upon receiving a request from the one or more external electronic devices for a service set identifier in the logon information, returning a response message to the one or more external electronic devices;

upon receiving a connection request from the one or more external electronic devices, verifying a password in the connection request for consistency with a password in the logon information according to a second length of the password in the logon information; and in response to the passwords in the connection request being consistent with the password in the logon information, having the one or more external electronic devices connect with the P2P node.

12. The method according to claim 10, wherein the method further comprises:

receiving, by the P2P node, a data packet from an external electronic device;

forwarding the data packet from the P2P node to the station node; and sending the data packet from the station node to the wireless access point for forwarding to a target device.

13. The method according to claim 12, wherein the data packet comprises Uniform Resource Locator (URL) information, and the wireless access point maps the URL information to an IP address through a Domain Name System (DNS), and forwards the data packet to the target device at the IP address.

14. The method according to claim 12, wherein forwarding the data packet from the P2P node to the station node comprises:

determining whether a source address of the data packet is a first IP address of the P2P node;

in response to determining that the source address of the data packet is the first IP address of the P2P node, translating the first IP address into a target IP address;

searching a routing table for a second IP address corresponding to the first IP address; and forwarding a converted data packet from the target IP address to the station node at the second IP address.

15. The method according to claim 10, wherein the method further comprises:

receiving, by the station node, a data packet from the external wireless access point;

forwarding the data packet from the station node to the P2P node; and sending the data packet in the P2P node to an external electronic device.

16. The method according to claim 15, wherein forwarding the data packet from the station node to the P2P node comprises:

determining a second IP address of a station node from which the data packet originates;

searching a routing table for a first IP address corresponding to the second IP address; and forwarding the data packet to the P2P node at the first IP address.

* * * * *